May 3, 1927.
L. D. SOUBIER
1,626,704
GLASS FORMING APPARATUS
Filed Nov. 15, 1920     2 Sheets-Sheet 1
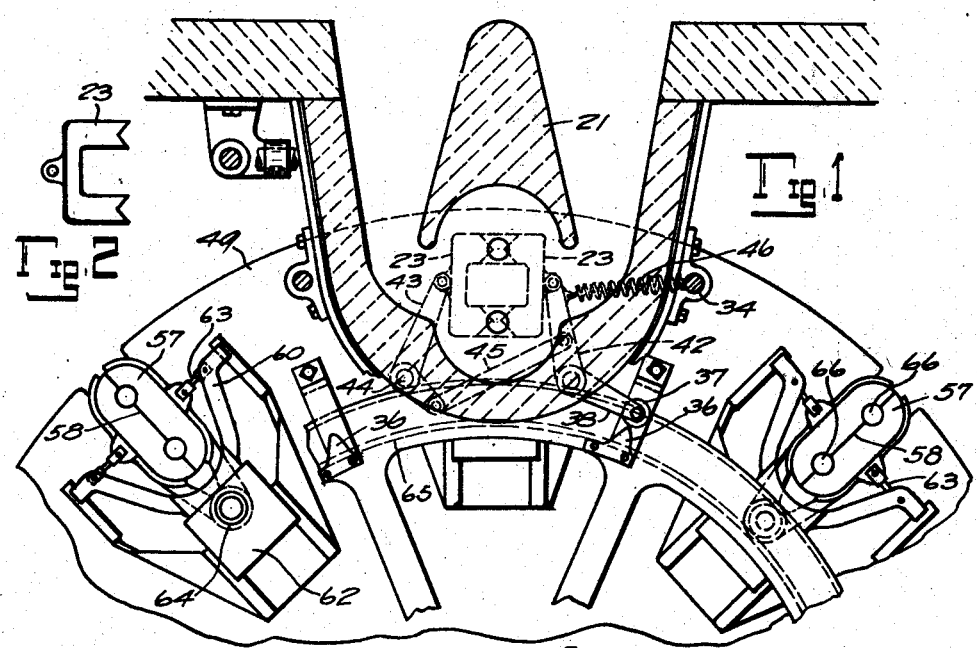
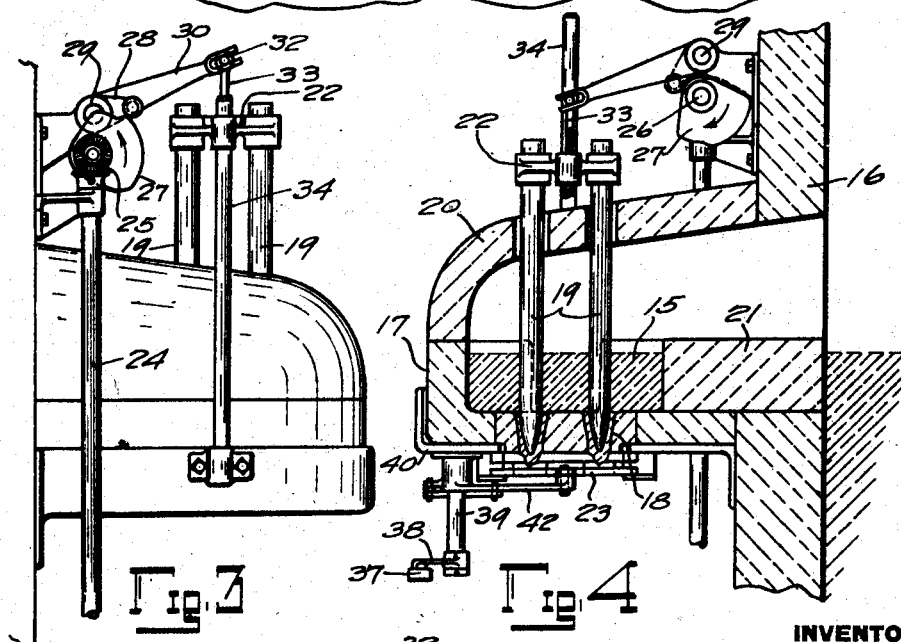
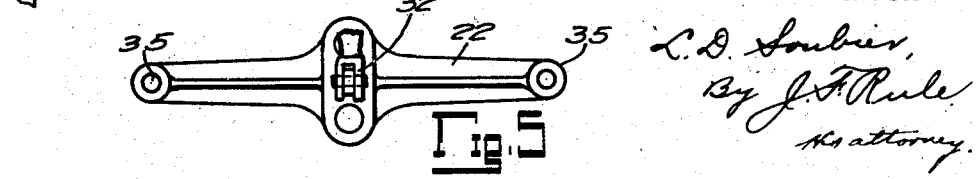
INVENTOR

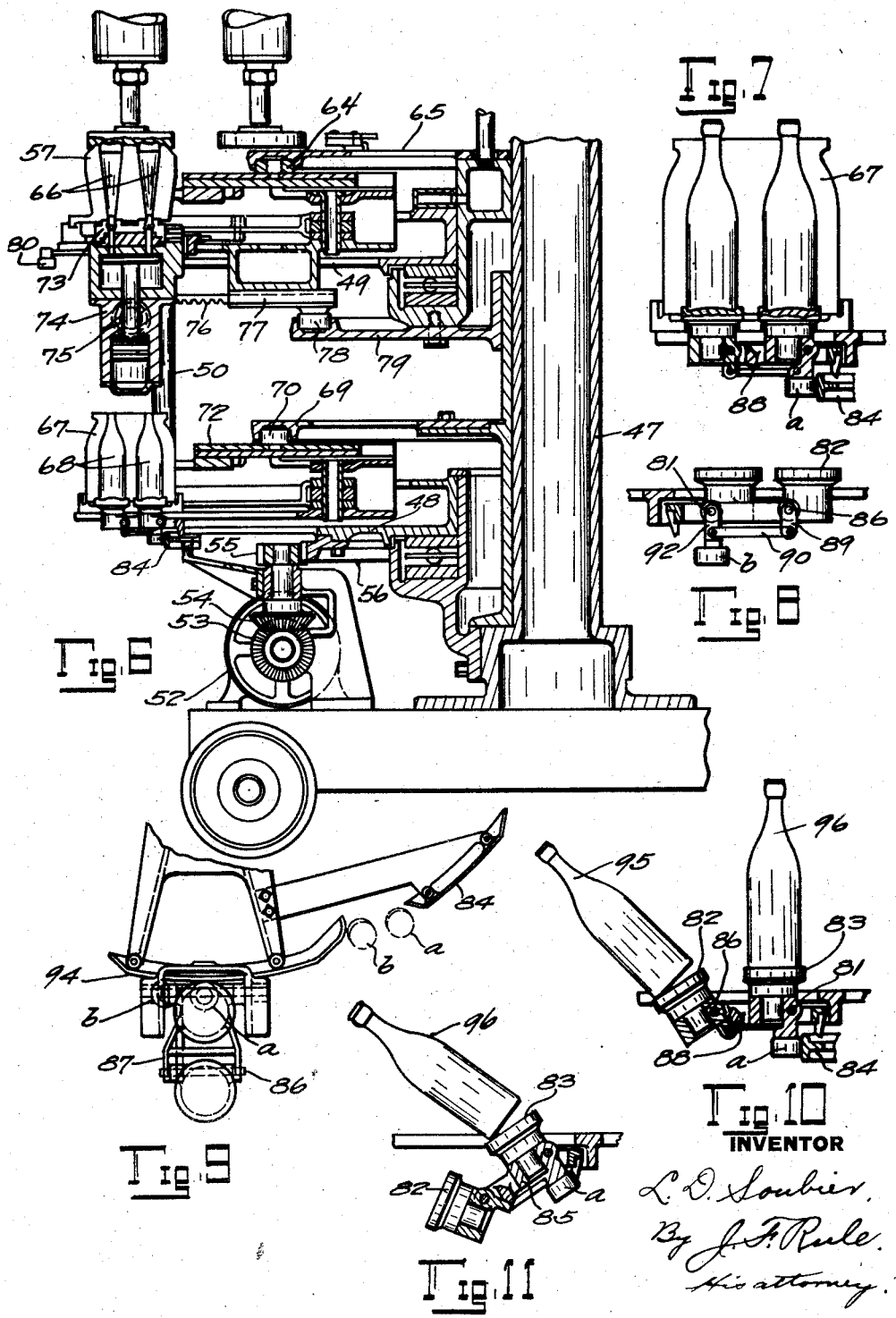

Patented May 3, 1927.

1,626,704

UNITED STATES PATENT OFFICE.

LEONARD D. SOUBIER, OF TOLEDO, OHIO, ASSIGNOR TO THE OWENS BOTTLE COMPANY, OF TOLEDO, OHIO, A CORPORATION OF OHIO.

GLASS-FORMING APPARATUS.

Application filed November 15, 1920. Serial No. 424,198.

My invention relates to means for forming individual charges of glass from a molten supply and shaping said charges to produce finished articles of glassware.

An object of the invention is to provide an improved form of feeder by which a plurality of charges of glass are formed and delivered simultaneously to a plurality of molds or mold cavities. A further object of the invention is to provide an improved form of plural cavity mold and actuating means therefor. A further feature of the invention relates to a novel arrangement of the mold bottoms and actuating means therefor, whereby a plurality of bottles or other articles arranged radially with respect to the axis of the mold carriage, are tilted successively to discharge the articles without interference with each other.

Other features and advantages will appear hereinafter.

In the accompanying drawings:

Figure 1 is a part sectional plan showing the gob feeding mechanism and the glass forming machine therebeneath.

Figure 2 is a detail showing one of the double cutter blades.

Figure 3 is a side elevation of the gob feeder.

Figure 4 is a part sectional elevation of the same looking in the opposite direction from that of Figure 3.

Figure 5 is a plan of the yoke which carries the feeder plungers.

Figure 6 is a sectional elevation through one side of the forming machine.

Figure 7 is a part sectional elevation showing one of the double molds and mold bottoms.

Figure 8 is a view of the mold bottoms looking in the opposite direction from that of Figure 7.

Figure 9 is a fragmentary view showing the mold bottoms and their operating cams.

Figure 10 is a view similar to Figure 7, but with the outer mold bottom tilted.

Figure 11 is a similar view, but with both mold bottoms tilted.

Referring particularly to Figures 1 to 4 inclusive, the molten glass 15 is supplied from a melting tank or container 16 having a forehearth or boot 17 into which the glass flows and from which it is discharged through outlet openings 18 in the floor of said boot. The flow of glass is controlled by vertically reciprocating plungers 19 which extend downward through openings in the enclosing wall 20 of the boot. These plungers are carried in a yoke 22 and reciprocate together. The downward movement of the plungers assists in expelling the charges of glass in formed masses of gobs. The upward movement of the plungers retards or stops the flow. A pair of cutters 23 operate periodically in synchronism with the movements of the plungers to sever the charges and permit them to drop into the molds therebeneath. The cutting mechanism herein shown is not claimed in the present application. In my co-pending application Serial Number 638,463, I show and claim cutting mechanism adapted to simultaneously sever a plurality of suspended charges of glass. A block 21 divides the flow of glass through the boot and causes a uniform distribution and temperature of the glass surrounding the plungers and issuing from the openings 18.

The mechanism for reciprocating the yoke 22 and plungers, comprises a vertical drive shaft 24 (Fig. 3) which is driven continuously from the glass forming machine or its motor through suitable gearing (not shown), and through gears 25 imparts a continuous rotation to a horizontal shaft 26 carrying a cam 27. The cam 27 operates a rock arm 28 on a rock shaft 29 carrying an arm 30 having a driving connection 32 to a rod 33 adjustably connected to the yoke 22. The yoke is guided in its vertical movements by stationary guide rods 34 extending through bearing sleeves 35 in the ends of the yoke. The cutters 23 are actuated by cams 36 (Fig. 1) on the mold carriage. As the carriage rotates, the cams successively engage a roll 37 on a rock arm 38 fixed to a rock shaft 39 journalled in a frame 40 which forms a support for the boot 17. A rock arm 42 also fixed to the rock shaft 39 carries one of the cutters 23. The other cutter is carried by a bell crank 43 pivoted at 44 and connected through a link 45 to the arm 42. It will be seen that with this construction each cam 36 as it engages the roll 37 will operate the cutter blades, moving them quickly to the cutting position shown in Figure 1. As the cam passes the roll 37, the cutters are quickly withdrawn by a spring 46.

The glass blowing machine may be of the general type of construction disclosed and claimed in the patent to Joseph B. Graham, 1,405,204, January 31, 1922. Various features of construction which in themselves form no part of the present invention have been omitted from the disclosure in the present case. This machine (Fig. 6) comprises a central stationary column 47 on which is mounted a carriage comprising a lower mold table 48 and an upper mold table 49 connected by vertical columns 50. The carriage is rotated continuously by a motor 52 which is connected through a train of gears 53, 54 and 55 to drive an annular gear 56 attached to the carriage. Mounted on the upper carriage is a ring of blank molds 57 spaced at equal intervals around the axis of the machine. Each mold 57 comprises horizontally separable sections, the meeting faces 58 of which are in a vertical plane radial to the axis of the machine when the mold is closed. The two mold sections are carried on a pair of arms pivoted to the mold table. A yoke 60 carried by a radially slidable frame 62 is connected through links 63 to the mold sections. The sliding frame 62 carries a cam roll 64 which runs in a stationary cam 65. The mold is opened and closed by the inward and outward radial movement of the frame 62, the cam 65 being shaped to effect these movements at the desired points in the rotation of the carriage. Each of the parison molds 57 comprises a plurality of radially arranged mold cavities 66.

Finishing molds 67 having mold cavities 68 corresponding to the parison mold cavities 66, are mounted on the lower mold table and are opened and closed by mechanism similar to that used in connection with the parison molds. Such mechanism comprises a stationary cam 69 on which runs a roll 70 carried by a radially sliding frame 72 having connections with the finishing molds for opening and closing them. Directly beneath each mold 57 and in register therewith is a neck mold 73 comprising horizontally separable sections, said neck mold being carried by a transfer head 74. This head is rotatable about a horizontal axis 75 after the blank mold is opened, to swing the bare blank supported in the neck mold downward into the open blow mold 67, which then closes, permitting the parison to be blown to its finished form. The head 74 is rotated by a rack and pinion, the rack 76 being carried by a frame 77 having a cam roll 78 running on a stationary cam 79 whereby the rack is reciprocated. The neck mold is opened and closed by a suitable cam (not shown) with which engages a cam roll 80 having an operating connection with the neck mold.

The bottom plates for the finishing molds and the mechanism by which said plates are separately tilted and controlled will now be described. Associated with each finishing mold 67 are the two bottom plates 82 and 83 which form mold bottoms or closures for the lower ends of the outer and inner mold cavities respectively. The inner bottom plate 83 is carried on a supporting block or frame 85 mounted to tilt about a pivot 81. The tilting movements of the bottom 83 are controlled by stationary cams 84 and 94, on which runs a roll $a$ on the support 85. The outer bottom plate 82 carries a pivot pin 86 by which it is mounted to tilt in a yoke 87 forming an extension of the frame 85. A stop 88 limits the tilting movement of the bottom 82. The tilting of the bottom 82 is controlled by the cams 84, 94, and for this purpose a crank arm 89 fixed to the pivot pin 86, is connected through a link 90 to an arm 92 carrying a roll $b$ which runs on the cams 84, 94. The arm 92 is journalled on the pivot pin 81. When the mold 67 is in its closed position the bottoms 82 and 83 therefor are held in operative position by the mold sections independently of the cams 84, 94.

Referring to Figure 9, as the finishing mold advances from right to left or in a clockwise direction, the cam rolls $a$ and $b$ engage the cam 84 and hold the mold bottoms up while the mold opens. The bottles 95 and 96 are now supported on the bottom plates alone. As the carriage advances, the roll $b$ first runs off the cam 84, permitting the outer bottom 82 to tilt to the Figure 10 position, whereby the bottle is tilted by gravity and discharged from the machine. The cam roll $a$ next runs off the cam, permitting the inner bottom 83 to tilt, as shown in Figure 11, and thereby discharge the inner bottle 96. At the same time the outer bottom plate 82 is swung downward still farther to a position in which it will not interfere with the discharge of the bottle 96.

After the two bottles have been discharged, the cam rolls $b$ and $a$ are brought successively into engagement with the cam 94 which thereby returns the mold bottoms to horizontal position, permitting the finishing mold to again close and support said bottoms until they are again brought to discharging position. The parts are so arranged that the parisons are swung down into the open finishing molds while the latter are opposite the cam 94.

Modifications may be resorted to within the spirit and scope of my invention.

What I claim is:

1. In a glass forming machine, the combination of a rotary mold carriage, upper and lower molds thereon, both having mold cavities arranged radially at different distances from the axis of the carriage, means for opening and closing the molds, and means for simultaneously swinging the bare parisons in a plane radial to the mold carriage from the upper to the lower molds during the rotation of the mold carriage.

2. The combination of a rotating mold carriage, a parison mold thereon having a plurality of mold cavities open at their upper ends to receive charges of glass, a finishing mold beneath and in register with the parison mold and having a corresponding number of mold cavities, a transfer head, a neck mold carried thereby in register with the parison mold, means to open the parison mold and leave the bare parisons supported in the neck mold, and means operating during the rotation of the carriage, to rotate said head and swing the parisons downward in a plane radial to the mold carriage, into position to be enclosed by the finishing mold.

3. The combination of a rotating mold carriage, a parison mold thereon having a plurality of mold cavities open at their upper ends to receive charges of glass, a finishing mold beneath and in register with the parison mold and having a corresponding number of mold cavities, a transfer head, a neck mold carried thereby in register with the parison mold, means to open the parison mold and leave the bare parisons supported in the neck mold, and means operating during the rotation of the carriage to rotate said head and swing the parisons downward in a plane radial to the mold carriage, into position to be enclosed by the finishing mold, the mold cavities in said molds being radially disposed at different distances from the axis of the mold carriage.

4. In a glass forming machine, the combination with a rotary mold carriage, of mold bottoms arranged radially at different distances from the axis of the carriage, and automatic means for separately tilting said mold bottoms in succession.

5. In a glass forming machine, the combination with a rotary mold carriage, of mold bottoms arranged radially at different distances from the axis of the carriage, and automatic means co-operating with said mold bottoms and governed by the position of the carriage for successively discharging articles supported on said bottoms.

6. In a glass forming machine, the combination with a rotary mold carriage, of mold bottoms arranged radially at different distances from the axis of the carriage, and automatic means governed by the movement of the carriage for successively actuating said mold bottoms in the order of their radial positions, commencing with the outermost bottom, for successively discharging articles supported in said bottoms.

7. The combination of a rotatable mold carriage, mold bottoms supported thereon and arranged radially at different distances from the axis of the carriage, and automatic means for tilting the outermost bottom to a discharging position and then tilting the next mold bottom to discharging position, and further tilting the first mold bottom to position to prevent interference with the discharge of an article from the second mold bottom.

8. In a glass forming machine, the combination with a mold carriage rotatable about a vertical axis, radially arranged mold bottoms at different distances from said axis, said bottoms mounted for separate tilting movement, and cams for controlling said tilting movements.

9. The combination with a mold carriage rotatable about a vertical axis, of mold bottoms tiltably mounted thereon and arranged at different distances from said axis and in the same radial plane, a stationary cam, and means connected with said mold bottoms to run on said cam and arranged to cause the successive tilting of the mold bottoms as the carriage advances.

10. The combination with a rotary mold carriage, of inner and outer mold bottoms, the inner mold bottom having a pivotal connection with the carriage, permitting it to tilt, the outer mold bottom having a pivotal connection with the inner mold bottom, permitting the outer bottom to tilt relatively to the inner one, a cam, and separate connections between said cam and the mold bottoms for holding them up, said connections arranged to first permit the outer mold bottom to tilt as the carriage advances and then to permit the inner mold bottom to tilt and thereby carry the outer mold bottom downward to a lower position.

11. In a glass forming machine, the combination with means for simultaneously delivering a multiple of gobs of molten glass from a molten mass, of a support traveling in a closed path, a series of groups of molds thereon, each group comprising a multiple of blank molds adapted to receive the gobs of glass and form them into blanks, a complementary multiple of finishing molds, and means for transferring the blanks from the blank molds to the finishing molds and blowing the blanks to finished form therein.

12. In a glass forming machine, the combination with a rotary mold carriage, a series of groups of finishing molds on the carriage, the molds of each group being radially arranged, and automatic means for discharging in succession the individual articles from the molds of each group.

13. In a glass forming machine, the combination with a rotary mold carriage, a series of groups of finishing molds on the carriage, the molds of each group being radially arranged, and automatic means for discharging radially in succession the individual articles from the molds of each group.

14. In a glass forming machine, the combination of a rotary mold carriage, of a series of groups of blank molds thereon, a series of groups of finishing molds thereon, each group of both series being arranged radially, and means for transferring the blanks of each series to the complementary finishing molds during the rotation of the mold carriage.

Signed at Toledo, in the county of Lucas and State of Ohio, this 10th day of November, 1920.

LEONARD D. SOUBIER.